United States Patent
Chen et al.

(10) Patent No.: US 11,333,614 B2
(45) Date of Patent: May 17, 2022

(54) INSPECTION SYSTEM OF SEMICONDUCTOR DEVICE AND RELATED INSPECTION METHOD

(71) Applicant: Yangtze Memory Technologies Co., Ltd., Wuhan (CN)

(72) Inventors: Guangdian Chen, Wuhan (CN); Jin Xing Chen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 16/792,316

(22) Filed: Feb. 17, 2020

(65) Prior Publication Data

US 2021/0172879 A1    Jun. 10, 2021

Related U.S. Application Data

(63) Continuation of application No. PCT/CN2019/122869, filed on Dec. 4, 2019.

(51) Int. Cl.
*G01N 21/88*    (2006.01)
*G01N 21/95*    (2006.01)

(52) U.S. Cl.
CPC ..... *G01N 21/8806* (2013.01); *G01N 21/9501* (2013.01)

(58) Field of Classification Search
CPC .......... G01N 21/8806; G01N 21/9501
USPC ........ 356/237.1–237.6, 239.1–239.8
See application file for complete search history.

(56) References Cited

U.S. PATENT DOCUMENTS

| | | | |
|---|---|---|---|
| 6,259,094 B1* | 7/2001 | Nagai | H01J 37/244 |
| | | | 250/310 |
| 2011/0188032 A1 | 8/2011 | Verma | |
| 2013/0056635 A1* | 3/2013 | Kimba | H01L 21/681 |
| | | | 250/310 |
| 2017/0082263 A1 | 3/2017 | Byrnes | |
| 2018/0216797 A1 | 8/2018 | Khorasaninejad | |
| 2019/0011535 A1* | 1/2019 | Park | G02B 26/106 |
| 2019/0049632 A1 | 2/2019 | Shin | |
| 2019/0162592 A1* | 5/2019 | Khorasaninejad | G01J 3/18 |
| 2020/0217796 A1* | 7/2020 | Kim | G01J 3/44 |

FOREIGN PATENT DOCUMENTS

| | | |
|---|---|---|
| CN | 2824024 Y | 10/2006 |
| CN | 101171506 A | 4/2008 |
| CN | 105008983 A | 10/2015 |

(Continued)

OTHER PUBLICATIONS https://www.researchgate.net Enhanced Patterned Wafer Defect Detection Using a Plasmonic Waveguide Metalens Array, Mar. 2017, 3 pages.*

*Primary Examiner* — Tri T Ton
(74) *Attorney, Agent, or Firm* — Winston Hsu

(57) ABSTRACT

An inspection system of semiconductor device includes a light source for producing a light beam, a lens module including at least one metalens, a receiver, and a processor. During an inspection process, the light beam emitted from the light source is focused on a target object by the metalens of the lens module and is reflected to form a reflected light by the target object. The receiver is used for receiving the reflected light. The processor is used for receiving an electric signal corresponding to the reflected light and generating an inspection result.

14 Claims, 6 Drawing Sheets

(56) References Cited

FOREIGN PATENT DOCUMENTS

| | | |
|---|---|---|
| CN | 205317229 U | 6/2016 |
| CN | 105929560 A | 9/2016 |
| CN | 108120371 A | 6/2018 |
| CN | 108291983 A | 7/2018 |
| CN | 108873287 A | 11/2018 |
| CN | 109507765 A | 3/2019 |
| CN | 110007451 A | 7/2019 |
| CN | 110426397 A | 11/2019 |
| JP | 2019-197097 A | 11/2019 |
| WO | 2006/121843 A2 | 11/2006 |
| WO | 2019/216112 A1 | 11/2019 |

* cited by examiner

INSPECTION SYSTEM OF SEMICONDUCTOR DEVICE AND RELATED INSPECTION METHOD

CROSS REFERENCE TO RELATED APPLICATIONS

The present application is a continuation of PCT application Ser. No. PCT/CN2019/122869, filed on Dec. 4, 2019, designating the United States, the contents of which are hereby incorporated by reference in their entirety.

BACKGROUND OF THE INVENTION

1. Field of the Invention

The present invention relates to an inspection system and a related inspection method, and more particularly to an inspection system of semiconductor device and a related inspection method.

2. Description of the Prior Art

With the high development of semiconductor technology, the integration of semiconductor devices becomes greater in a trend towards scaling down the feature size of the semiconductor devices. Therefore, it is particularly important to inspect the defect with much small size in order to increase the yield. In the current inspection technique, the minimum pixel size of one of the advanced inspection systems, KLA2930 for example, for inspecting the defect of semiconductor device is 36 nanometers (nm), thus it has an inspection limitation that the defect with a size less than 20 nm cannot be discovered by the inspection system KLA2930. Therefore, it is still an important issue to develop an inspection system and related method for inspecting the defect with smaller sizes on the semiconductor devices.

SUMMARY OF THE INVENTION

It is one of the objectives of the present invention to provide an inspection system of semiconductor device and related inspection method, wherein at least one metalens is adopted in the inspection system.

According to an embodiment of the present invention, an inspection system of semiconductor device is provided. The inspection system includes a light source for producing a light beam, a lens module including at least one metalens, a receiver, and a processor. During an inspection process, the light beam emitted from the light source is focused on a target object by the metalens of the lens module and is reflected to form a reflected light by the target object. The receiver is used for receiving the reflected light. The processor is used for receiving an electric signal corresponding to the reflected light and generating an inspection result.

According to an embodiment of the present invention, an inspection method of semiconductor device is provided. The inspection method includes following steps: (a) providing an inspection system of semiconductor device, wherein the inspection system includes a light source for producing a light beam, a lens module for receiving the light beam and including at least one metalens, a receiver for receiving a reflected light of the light beam, and a processor for receiving an electrical signal corresponding to the reflected light and generating an inspection result; (b) providing a target object facing the lens module, wherein the target object includes at least one semiconductor device; (c) emitting the light beam by the light source such that the light beam passing through the metalens is focused on the semiconductor device and forms a reflected light by the semiconductor device; (d) sending the electric signal corresponding to the reflected light to the processor after the receiver receives the reflected light; and (e) producing an inspection image by the processor according to the electric signal to obtain an inspection result.

The metalens included in the lens module can adjust the amplitude, the phase, the polarization of the light beam such that the light beam can be focused on the target object, breaking through the optical diffraction limit of traditional lenses. Accordingly, the inspection accuracy of the defect on the semiconductor device can reach to nanometer-scale grade.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
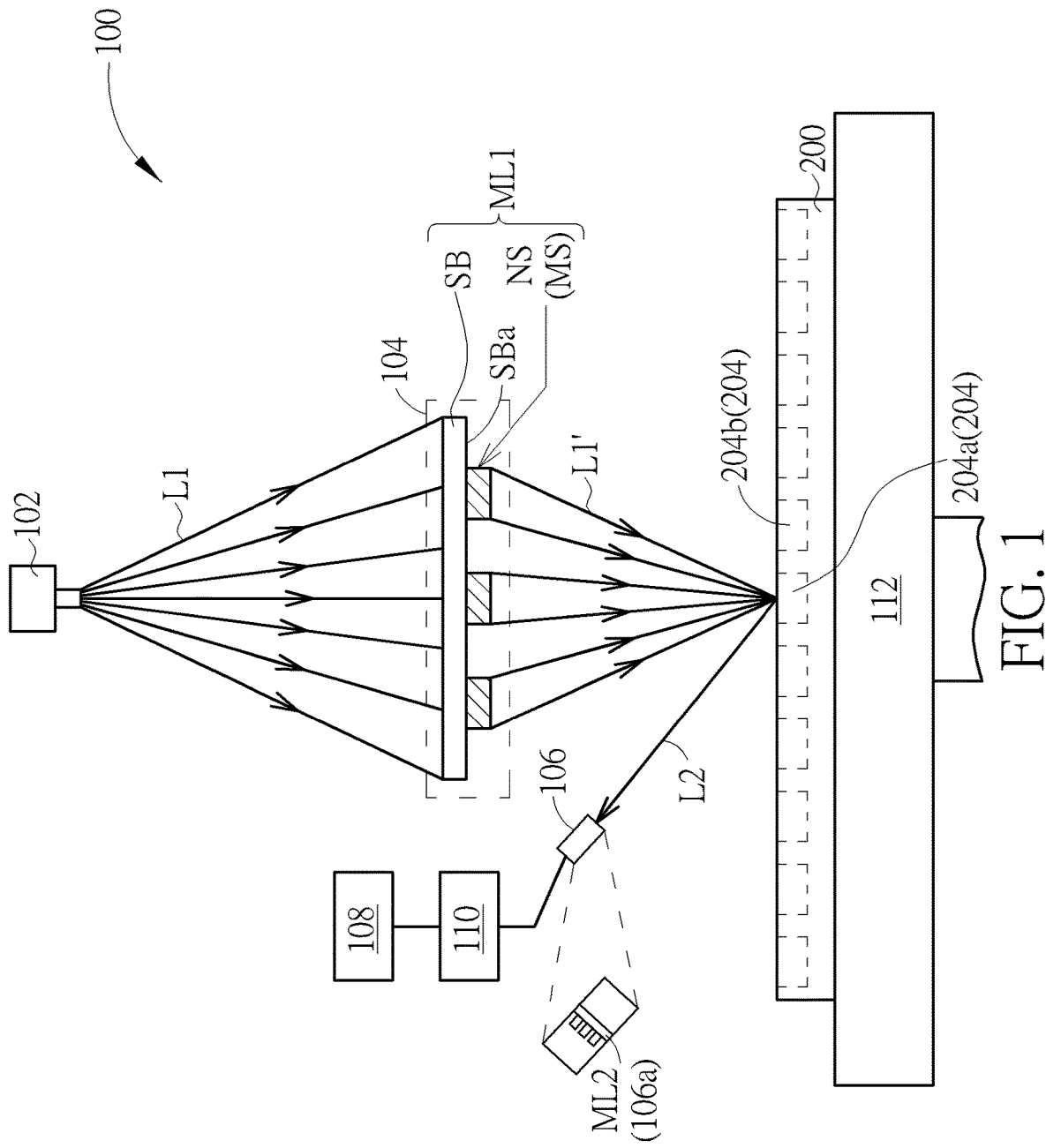
FIG. 1 is a schematic diagram of an inspection system of semiconductor device according to a first embodiment of the present invention.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense.

Similarly, terms, such as "a," "an," or "the," again, may be understood to convey a singular usage or to convey a plural usage, depending at least in part upon context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "substrate" refers to a material onto which subsequent material layers are added. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10~30% of the value (e.g., ±10%, ±20%, or ±30% of the value).

Referring to FIG. 1, FIG. 1 is a schematic diagram of an inspection system of semiconductor device according to a first embodiment of the present invention. As shown in FIG. 1, the semiconductor device 204 may refer to any element on a semiconductor wafer or semiconductor substrate which serves as a target object 200. For example, the semiconductor device 204 may refer to (but not limited to) circuit, transistor, conductive line, capacitor, inductance, antenna, etc. The semiconductor wafer or semiconductor substrate may include a plurality of semiconductor devices 204 to be inspected. The inspection system of semiconductor device of the present invention can be used for inspecting the defects of the structures and/or the patterns of the semiconductor devices 204. In the first embodiment, the inspection system 100 for inspecting the semiconductor devices 204 includes a light source 102, a lens module 104, a receiver 106, and a processor 108. The light source 102 can produce a light beam L1. The light beam L1 may be a light with any suitable wavelength, such as a visible light with a wavelength range from 390 nm to 700 nm or an ultraviolet with a wavelength range from 315 nm to 390 nm, but not limited thereto. During the inspection process, the target object 200 can be placed on a baseplate 112 included by the inspection system 100.

The lens module 104 includes one or more lenses for adjusting light path of the light beam L1 during an inspection process. Specifically, the lens module 104 includes at least one metalens ML1 that can focus the light beam L1 emitted from the light source 102 on the target object 200 during the inspection process. In detail, the metalens ML1 includes a transparent substrate SB and a metasurface MS disposed on a side SBa of the transparent substrate SB. The side SBa faces the object target 200 in this embodiment, which means the metasurface MS is disposed between the transparent substrate SB and the target object 100 during the inspection process, but the present invention is not limited thereto and the side SBa of the transparent substrate SB on which the metasurface MS is disposed may face the light source 102 in another embodiment. The structure and property of the metalens ML1 will be introduced in detail later.

As shown in FIG. 1, when the light beam L1 passes through the metalens ML1 of the lens module 104, the path of the light beam is adjusted, which is shown as the light beam L1'. When the light beam L1' is focused on the semiconductor device 204a on the target object 200, it is reflected to form a reflected light L2 by the semiconductor device 204a of the target object 200, and the reflected light L2 will enter the receiver 106. Then, the processor 108 can receive an electric signal corresponding to the reflected light L2 and therefore generate an inspection result. For example, the processor 108 can process the electric signal to produce an inspection image, such as a gray scale image, as the inspection result. In some embodiments, the inspection image can be compared with a predetermined design image to determine whether a defect exists or not, and the comparing result can be output to obtain the inspection result.

When performing the inspection process, the light source 102 is moved to a location that corresponds to a semiconductor device 204 (such as the semiconductor device 204a in FIG. 1) to be inspected, and the lens module 104 can also be moved to a location that corresponds to the semiconductor device 104a to be inspected. For example, the light source 102 and the lens module 104 are configured as a unit that can be moved as a whole or can be moved together, but not limited thereto.

Optionally, the inspection system 100 can further include a photoelectric converter 110 for receiving the reflected light L2 that passes through the receiver 106, wherein the photoelectric converter 110 is capable of producing the electric signal corresponding to the reflected light L2 and sending the electric signal to the processor 108. In detail, the receiver 106 may include one or more lens 106a that can adjust the path of the reflected light L2 so as to form an image corresponding to the semiconductor device 204a. Specifically, the receiver 106 may include one or more metalens (shown as the metalens ML2 in the partial enlargement picture of the receiver 106) that can adjust the path of the reflected light L2 and focus the reflected light L2 to form a high-resolution image corresponding to the semiconductor device 204a to the photoelectric converter 110. Then, the photoelectric converter 110 can produce the electric signal corresponding to the high-resolution image (or the reflected light L2) and send the electric signal to the processor 108 which is electrically connected to the photoelectric converter 110. In a variant embodiment, the photoelectric converter 110 may be incorporated in the receiver 106, and the receiver 106 includes the function of the photoelectric converter 110 and is electrically connected to the processor 108. In such case, the receiver 106 can send the electric signal corresponding to the reflected light L2 that is received by the receiver 106 to the processor 108.

After the inspection of the semiconductor device 204a, the light source 102 and the lens module 104 can be moved to a location corresponding to another one of the plurality of semiconductor devices 204 on the target object 200, such as an adjacent semiconductor device 204b. Then, the inspection steps can be repeated, such as producing light beam L1 to pass through the lens module 104 by the light source 102 and focusing the light beam L1' on the semiconductor device 204b to be inspected, forming a reflected light L2 to enter the receiver 106, producing an electric signal corresponding to the reflected light L2 to the processor 108, and generating an inspection result by the process 106. Redundant description of the inspection steps will not be repeated herein.

Figure 2:
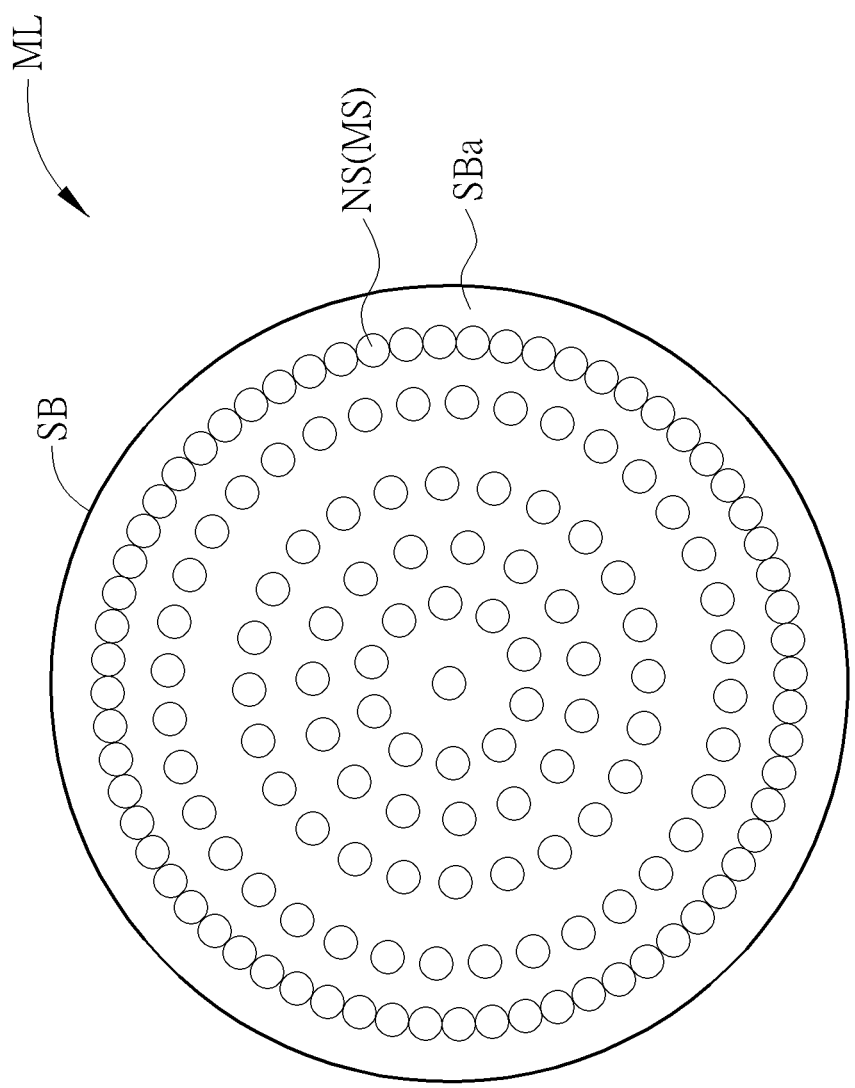
FIG. 2 is a schematic diagram of a top view of an example of a metalens according to the present invention.
Figure 3:
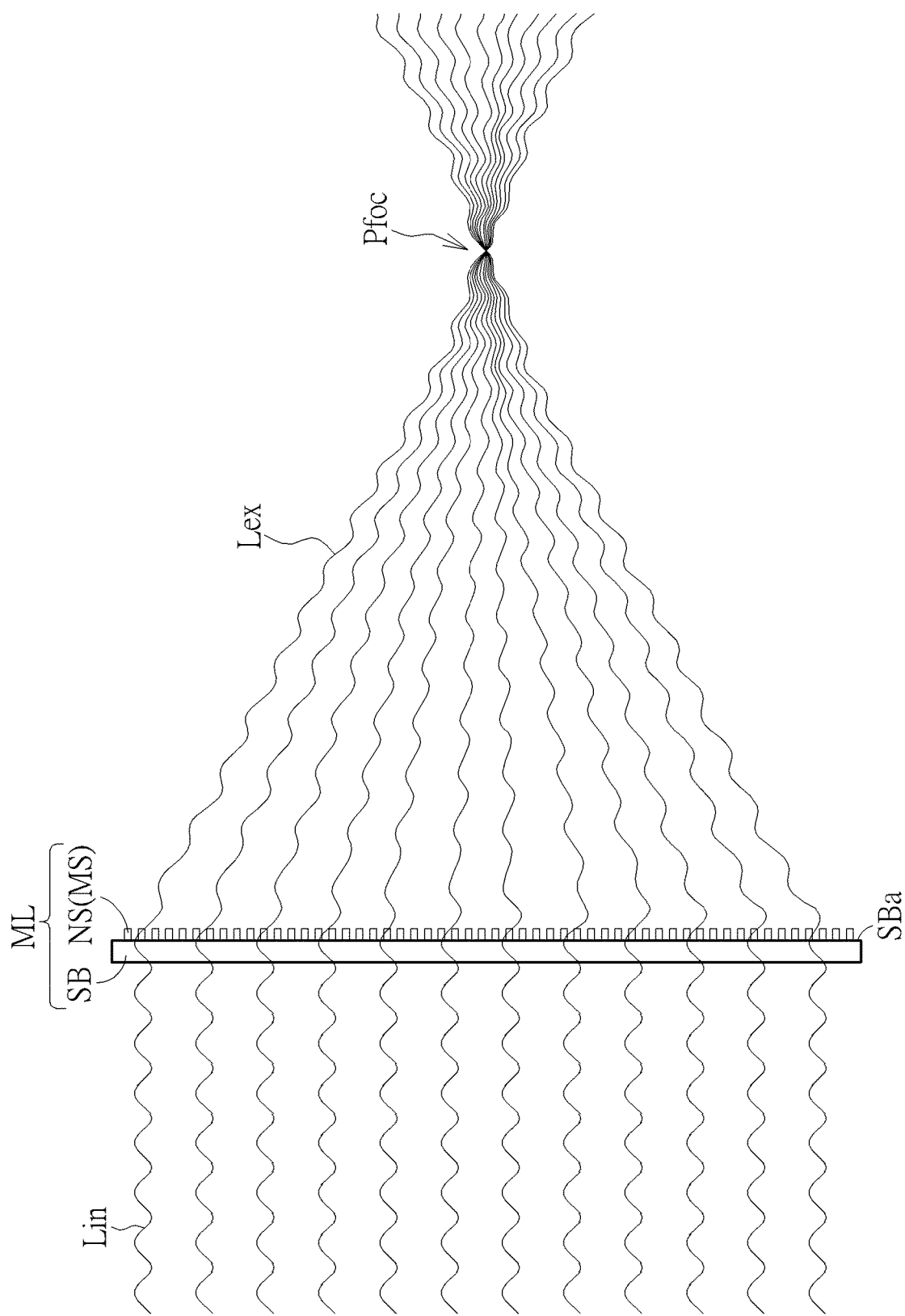
FIG. 3 is a schematic diagram of the light path of a metalens according to the present invention.

Referring to FIG. 2 and FIG. 3, FIG. 2 is a schematic diagram of a top view of an example of a metalens according to the present invention, and FIG. 3 is a schematic diagram of the light path of a metalens according to the present invention. The metalens ML shown in FIG. 2 and FIG. 3 may be an example of the metalens ML1 or an example of the metalens ML2 in FIG. 1. As shown in FIG. 2, the metalens ML includes a transparent substrate SB and a metasurface MS disposed on a side SBa of the transparent substrate SB. In detail, the metasurface MS includes a 2-dimensions (2D) surface resonator composed of a plurality of nanostructures NS disposed on the transparent substrate SB. The nanostructures NS includes metal materials with specific electromagnetic property and are arranged in a specific arrangement or patterns to from a 2D structure. The size of the nanostructures NS is less than the wavelength of the incident light for instance. In other words, the size of the nanostructures NS may be less than 390 nm or even less than 315 nm for example. Accordingly, by designing the shape, pattern, size, and arrangement of the nanostructures NS, the metasurface MS having the specific designed nanostructures NS can interact with the incident light or with the photons of the incident light, so as to block, absorb, enhance, or refract the photons of the light that enters the metasurface MS and further focus the light to a predetermined surface. In this example, the nanostructures NS have round top surfaces and are arranged as several concentric circles.

It should be noted that the metalens ML1 and the metalens ML2 shown in FIG. 1 may adopt various types of metalens with different arrangement, shapes, top surfaces, and/or structures of nanostructures NS and are not limited to FIG. 2. As shown in FIG. 3, due to the specific size, structure, and arrangement design of the nanostructures NS, when the incident light Lin passes through the metalens ML, it can be focused at a predetermined position Pfoc with a high definition or resolution, as shown by the exit light Lex. In other words, the optical field can be controlled by the design of the nanostructures NS.

Figure 4:
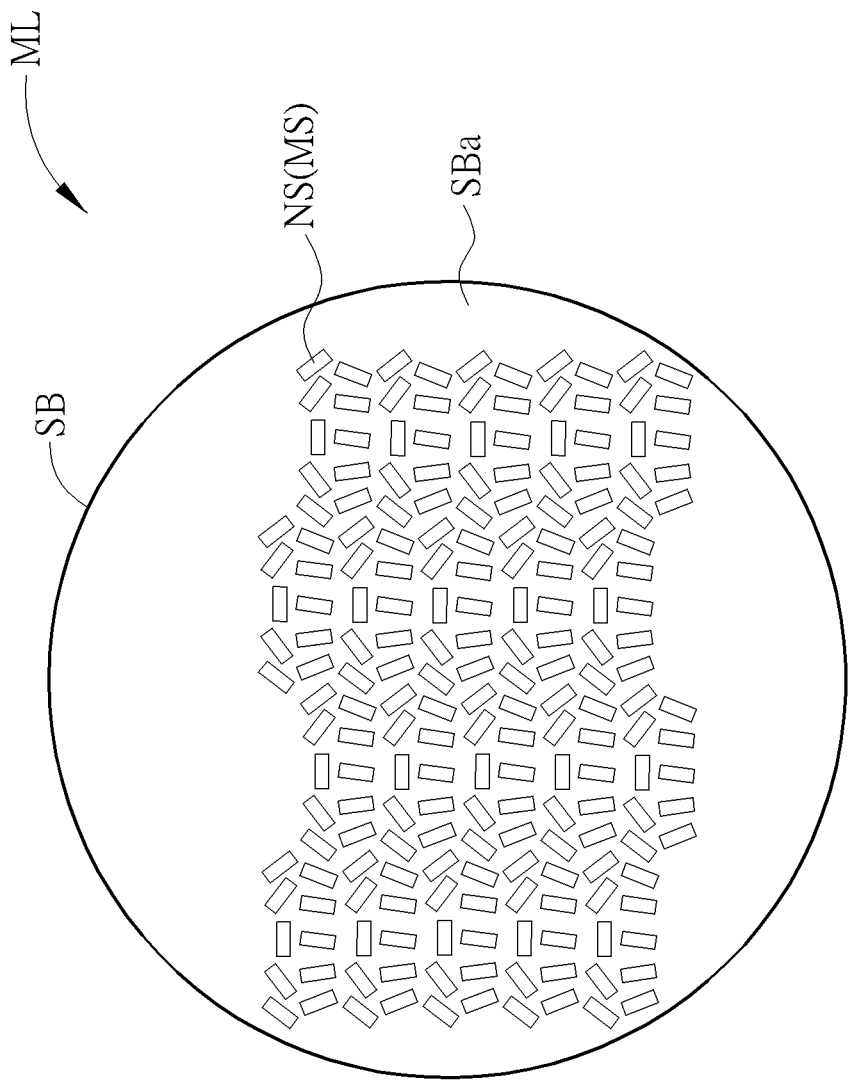
FIG. 4 is a schematic diagram of a top view of another example of a metalens.

FIG. 4 is a schematic diagram of a top view of another example of a metalens. In FIG. 4, the top surfaces of the nanostructures NS are rectangular, and the longitudinal axis of the nanostructures NS may extend along various directions. It should be noted that the patterns and arrangements of the examples of the metalens ML shown in FIG. 2 and FIG. 4 are not intended to limit the metalens ML1 and metalens ML2 (shown in in FIG. 1) used in the inspection system 100 of the present invention, and the metalens ML1 and metalens ML2 may adopt different types of metalens individually based on requirement.

Figure 5:
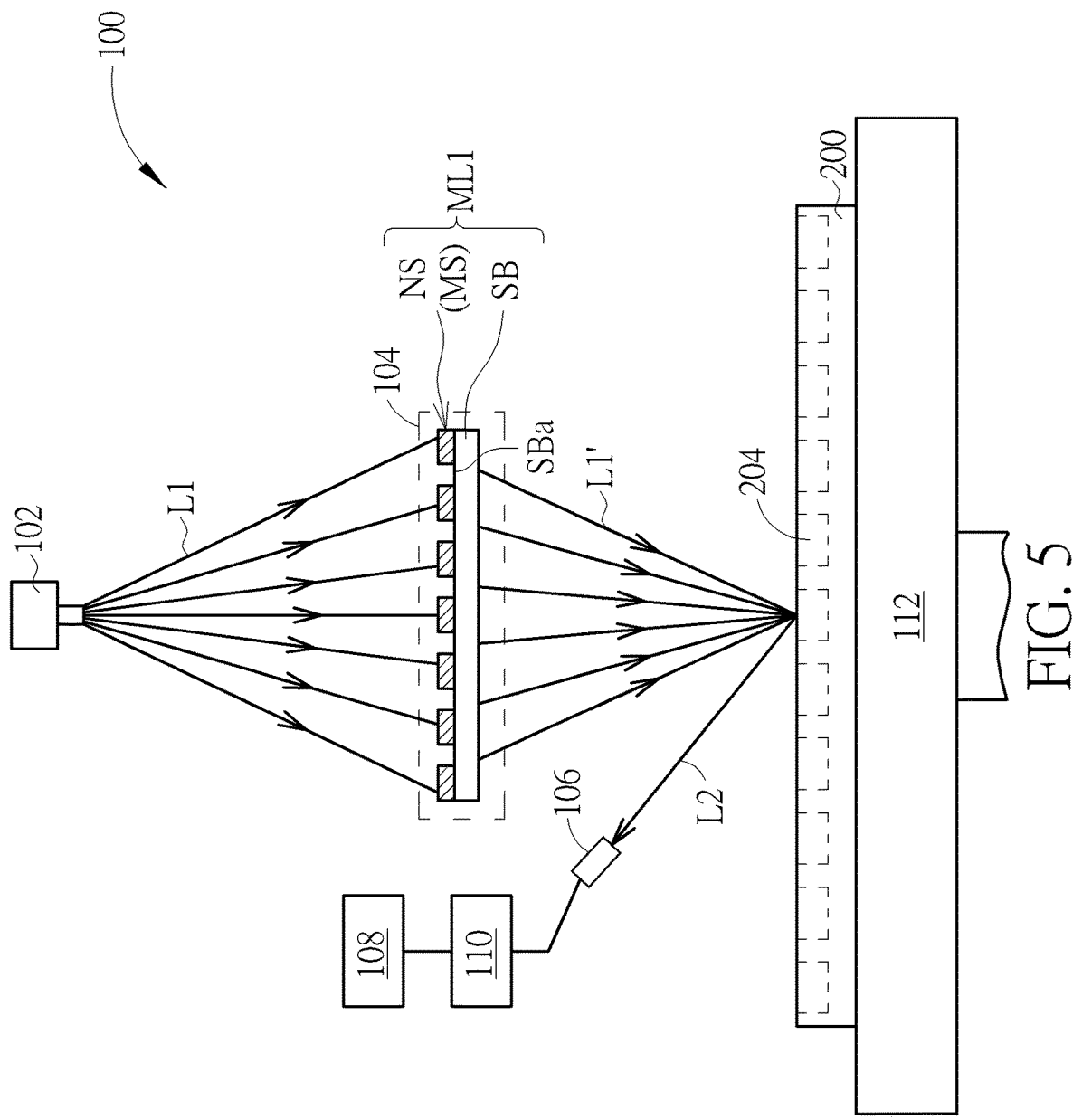
FIG. 5 is a schematic diagram of an inspection system of semiconductor device according to a second embodiment of the present invention.

Referring to FIG. 5, FIG. 5 is a schematic diagram of an inspection system of semiconductor device according to a second embodiment of the present invention. In this embodiment, the metasurface MS, composed of the nanostructures NS, of the metalens ML1 in the lens module 104 is disposed on the side SBa of the transparent substrate SB facing the light source 102 during the inspection process. In other words, when performing the inspection process, the nanostructures NS are disposed between the transparent substrate SB and the light source 102. In addition, the receiver 106 may include or not include metalens.

Figure 6:
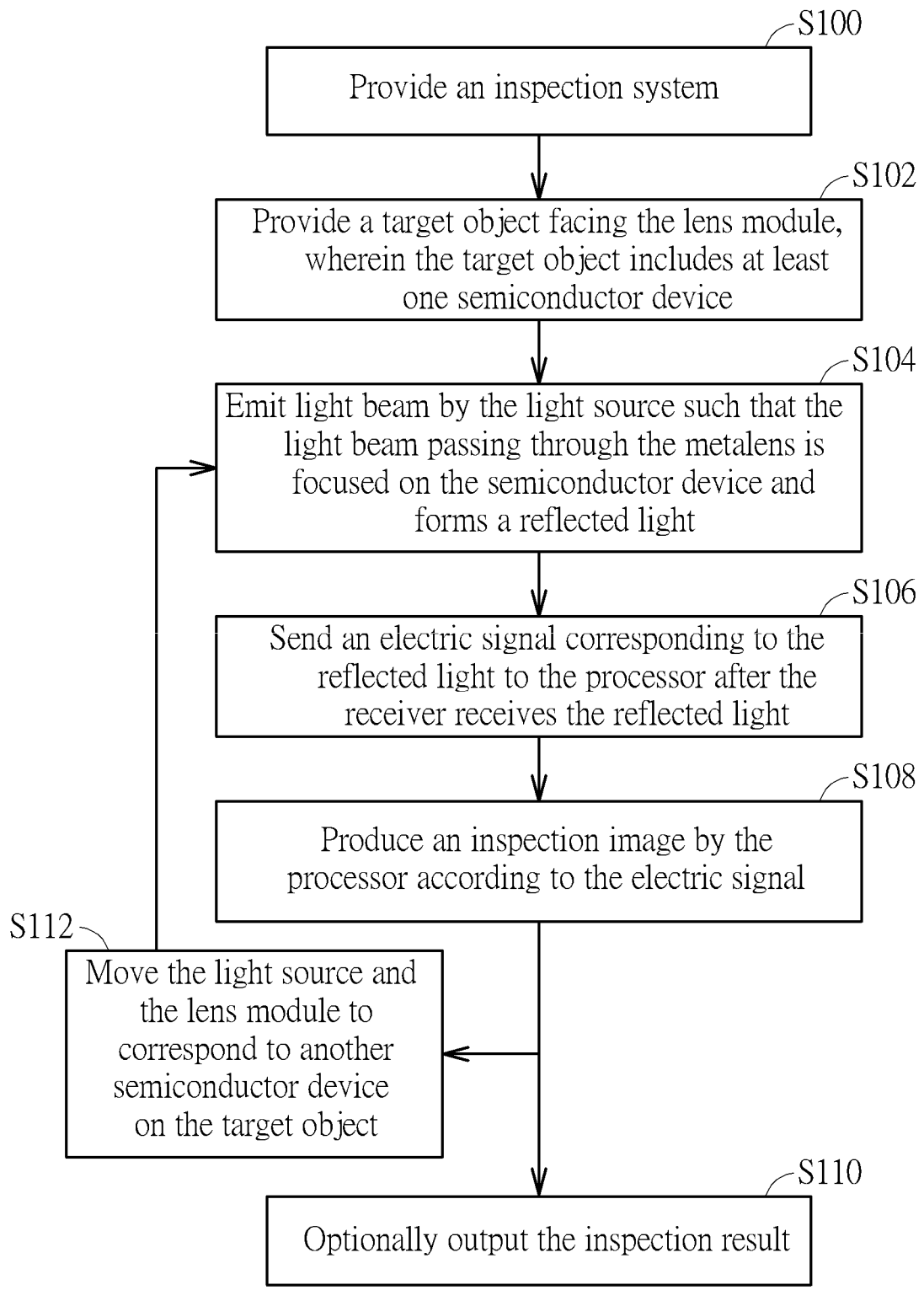
FIG. 6 is a process flow diagram of an inspection method of semiconductor device according to the present invention.

FIG. 6 is a process flow diagram of an inspection method of semiconductor device according to the present invention. The inspection method of semiconductor device includes following steps:

Step S100: Provide an inspection system, wherein the inspection system includes a light source for producing a light beam; a lens module for receiving the light beam and including at least one metalens; a receiver for receiving a reflected light of the light beam; and a processor for receiving an electric signal corresponding to the reflected light and generating an inspection result.

Step S102: Provide a target object facing the lens module, wherein the target object includes at least one semiconductor device.

Step S104: Emit the light beam by the light source such that the light beam passing through the metalens is focused on the semiconductor device and forms a reflected light by the semiconductor device.

Step S106: Send the electric signal corresponding to the reflected light to the processor after the receiver receiving the reflected light.

Step S108: Produce an inspection image by the processor according to the electric signal to obtain an inspection result.

Step S110: Optionally output the inspection result.

If there are a plurality of semiconductor devices needed to be inspected, the method may include a Step 112 of moving the light source and the lens module to a location corresponding to another one of the plurality of semiconductor devices on the target object and repeating Step 104 to Step 108 for inspecting each semiconductor device on the target object. In Step S108 or in Step S110, when the inspection image is produced by the processor, it can be compared with a predetermined design image to determine whether a defect exists or not, and the comparing result can be output to obtain the inspection result. Alternatively, the inspection images produced by the process in different inspection processes can be compared with each other for determining which semiconductor device(s) have defects.

According to some of the embodiments, the lenses used for imaging the light path are all metalenses. For example, all the lenses in the lens module and in the receiver may be metalenses, but not limited thereto. According to the present invention, various types of light with different wavelength range can be used in the inspection for scanning the semiconductor device, such as visible light and ultraviolet. The metalens can form high-resolution image for full band of visible light and ultraviolet. In other words, when performing the inspection process, the light beam emitted by the light source can have a wide range of wavelength. However, in some embodiments, a light with a specific wavelength can be adopted to perform the inspection process. The adopted light can be selected based on the semiconductor device or the material of the layer to be inspected. For example, when inspecting a photoresist layer, a visible light can be adopted as the light beam for scanning the photoresist layer, in order to prevent the photoresist layer from being effected by a light with high energy.

The metalens included in the lens module can adjust the amplitude, the phase, the polarization of the light beam such that the light beam can be focused on the target object, breaking through the optical diffraction limit of traditional lenses. In addition, the metalens in the receiver also has the ability of controlling the optical filed to enable the reflected light to be focused on the photoelectrical converter so as to form a high-resolution image.

Accordingly, the inspection accuracy of the defect on the semiconductor device can reach to nanometer-scale (Xnm, wherein X≤10) grade. The defect with a size less than 20 nm may be inspected, such that the yield of the fabrication of semiconductor device can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inspection system of semiconductor device, comprising:
    a light source for producing a light beam;
    a lens module comprising at least one first metalens, wherein during an inspection process, the light beam emitted from the light source is focused on a target object by the first metalens of the lens module and is reflected to form a reflected light by the target object, wherein the target object is a semiconductor wafer or a semiconductor substrate;
    a receiver for receiving the reflected light, wherein the receiver comprises at least one second metalens, the first metalens and the second metalens are different, and the second metalens of the receiver is capable of focusing the reflected light to form an image; and
    a processor for receiving an electric signal corresponding to the reflected light and generating an inspection result.

2. The inspection system of semiconductor device of claim 1, wherein the first metalens includes a transparent substrate and a metasurface disposed on a side of the transparent substrate.

3. The inspection system of semiconductor device of claim 2, wherein the metasurface includes a 2-dimensions (2D) surface resonator composed of a plurality of nanostructures disposed on the transparent substrate.

4. The inspection system of semiconductor device of claim 2, wherein the side of the transparent substrate on which the metasurface is disposed faces the light source during the inspection process.

5. The inspection system of semiconductor device of claim 2, wherein the side of the transparent substrate on which the metasurface is disposed faces the target object during the inspection process.

6. The inspection system of semiconductor device of claim 1, further comprising a photoelectric converter for receiving the reflected light that passes through the receiver, wherein the photoelectric converter is capable of producing the electric signal corresponding to the reflected light and sending the electric signal to the processor.

7. The inspection system of semiconductor device of claim 1, the processor is capable of processing the electric signal to produce an inspection image as the inspection result.

8. An inspection method of semiconductor device, comprising following steps:
    (a) providing an inspection system of semiconductor device, the inspection system comprising:
        a light source for producing a light beam;
        a lens module for receiving the light beam, wherein the lens module comprises at least one first metalens;
        a receiver for receiving a reflected light of the light beam, wherein the receiver comprises a second metalens, the first metalens and the second metalens are different, and the second metalens is capable of focusing the reflected light to form an image; and
        a processor for receiving an electrical signal corresponding to the reflected light and generating an inspection result;
    (b) providing a target object facing the lens module, wherein the target object comprises at least one semiconductor device, and the target object is a semiconductor wafer or a semiconductor substrate;
    (c) emitting the light beam by the light source such that the light beam passing through the first metalens is focused on the semiconductor device and forms a reflected light by the semiconductor device;
    (d) sending the electric signal corresponding to the reflected light to the processor after the receiver receives the reflected light; and
    (e) producing an inspection image by the processor according to the electric signal to obtain an inspection result.

9. The inspection method of semiconductor device of claim 8, wherein the first metalens includes a transparent substrate and a metasurface disposed on a side of the transparent substrate.

10. The inspection method of semiconductor device of claim 9, wherein the metasurface includes a 2-dimensions (2D) surface resonator composed of a plurality of nanostructures disposed on the transparent substrate.

11. The inspection method of semiconductor device of claim 9, wherein the side of the transparent substrate on which the metasurface is disposed faces the light source during an inspection process.

12. The inspection method of semiconductor device of claim 9, wherein the side of the transparent substrate on which the metasurface is disposed faces the target object during an inspection process.

13. The inspection method of semiconductor device of claim 8, wherein the inspection system further comprises a photoelectric converter for receiving the reflected light that passes through the receiver, and the photoelectric converter is capable of producing the electric signal corresponding to the reflected light and sending the electric signal to the processor.

14. The inspection method of semiconductor device of claim 8, wherein the target object comprises a plurality of semiconductor devices, and the inspection method comprises a step (f) of moving the light source and the lens module to a location corresponding to another one of the plurality of semiconductor devices on the target object and repeating the step (c) to the step (e) for inspecting each semiconductor device on the target object.

* * * * *